United States Patent [19]
Lambert

[11] 3,829,933
[45] Aug. 20, 1974

[54] METHOD AND APPARATUS FOR EVISCERATING SCALLOPS

[76] Inventor: William R. Lambert, P.O. Box 5403, Greensboro, N.C. 27401

[22] Filed: Aug. 3, 1972

[21] Appl. No.: 277,600

[52] U.S. Cl. .................................................. 17/53
[51] Int. Cl. ............................................ A22c 29/00
[58] Field of Search ...................... 17/52, 53, 54, 55

[56] References Cited
UNITED STATES PATENTS
3,662,432  5/1972  Wenstrom et al. ..................... 17/53

*Primary Examiner*—Robert Peshock

[57] ABSTRACT

A method and apparatus for processing shucked scallops by cleaning the viscera from the edible muscle. The muscles and attached viscera are placed upon the upper surfaces of a series of parallel rollers forming an inclined path. At least one scallop contact assembly is mounted above the upper surfaces of the parallel rollers for displacement longitudinally of the inclined path and serves to displace and level the scallops upon the rollers and to urge the scallops into the nips or valleys between adjacent rollers such that the driven rollers grip the viscera and remove it from the muscles. A fluid spray arrangement and the contact assembly controls the advancement of the scallops down the inclined path.

10 Claims, 6 Drawing Figures

PATENTED AUG 20 1974  3,829,933
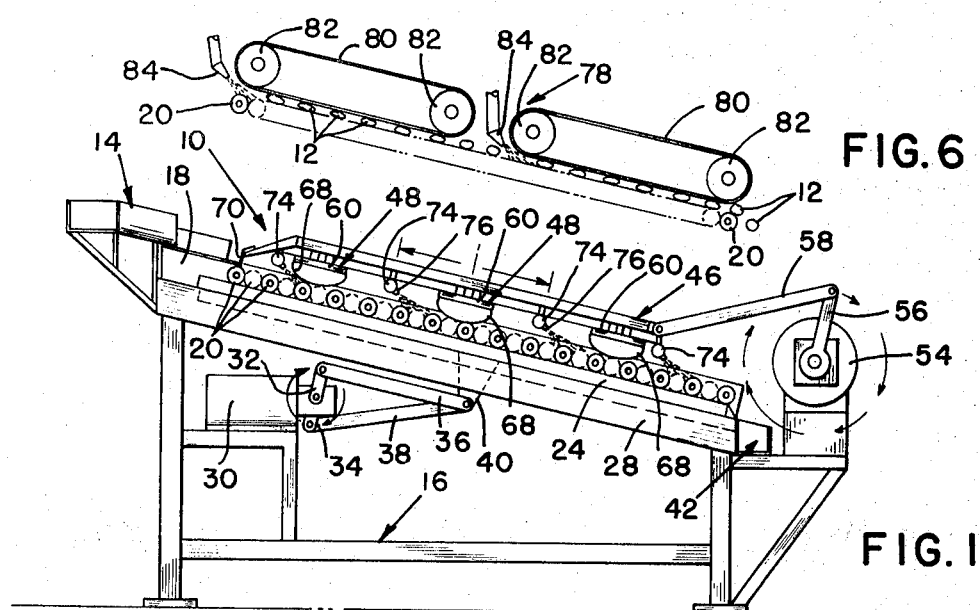
FIG. 6
FIG. 1
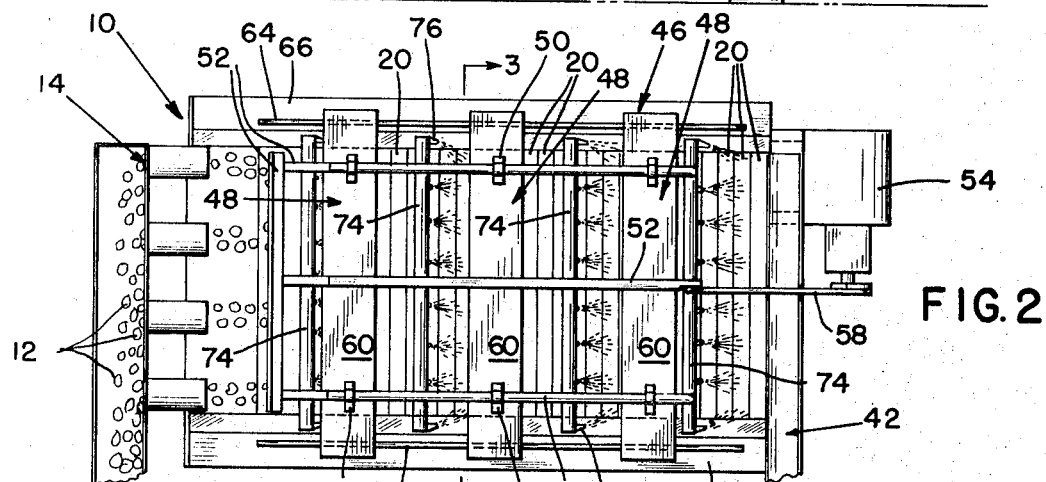
FIG. 2
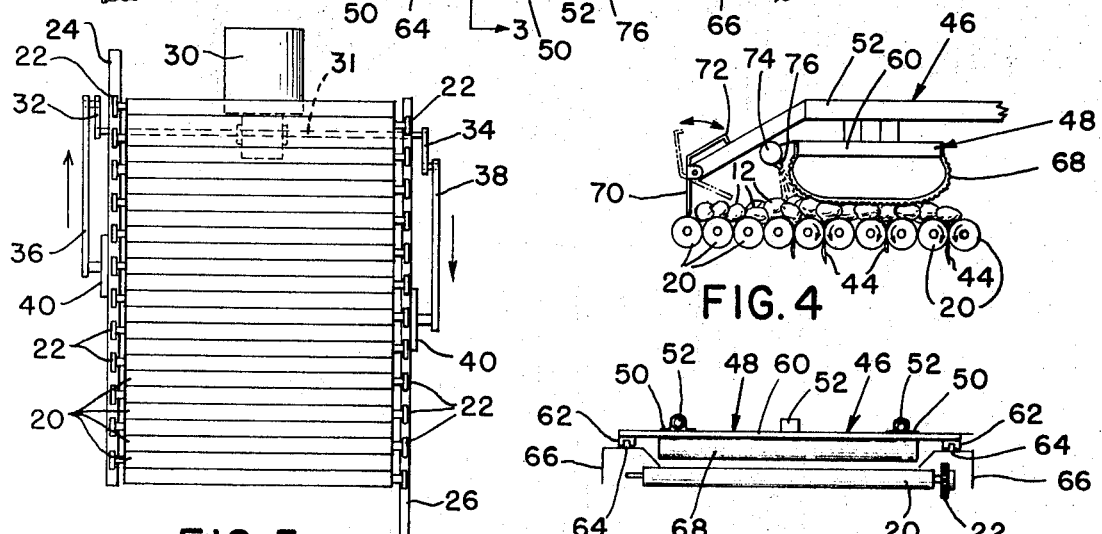
FIG. 5
FIG. 4
FIG. 3

3,829,933

METHOD AND APPARATUS FOR EVISCERATING SCALLOPS

BACKGROUND, BRIEF SUMMARY, AND OBJECTS OF THE INVENTION

This invention relates generally to the processing of scallops for human consumption and more particularly to the removal of the viscera from the edible muscle of shucked scallops.

It has been the conventional practice, until recently, to remove by hand the viscera from the edible muscle of scallops. In an effort to overcome such time consuming eviscerating operations, mechanical eviscerators such as disclosed in U.S. Pat. Nos. 3,129,456; 3,662,431; and 3,662,431 have been developed.

The present invention provides a system for removing viscera from the edible portions of scallops by directing the shucked scallops to the upper surfaces of a series of pairs of parallel rollers mounted in an inclined flight. At least one roller of each pair of rollers is adapted to be driven and the rollers are positioned such that the shucked scallops are at least partially located in the nips defined by the adjacent rollers of each pair. At least one assembly is positioned above the rollers which includes a scallop contact surface for displacement longitudinally of the inclined flight of rollers for leveling and distributing the scallops along the rollers and for forcing the scallops against the rollers such that the viscera can be caught in the nips between the rollers of each pair and pulled from the muscle. The contact surface and fluid spray heads facilitate and control the flow of scallops down the inclined rollers such that the edible muscle is discharged to a suitable collection means. The adjustable spray heads may be fixedly mounted above the rollers or may be displaced along a path longitudinally of the inclined flight of rollers.

One of the primary objects of the invention is the provision of a new and improved system for removing the viscera from the edible muscles of shucked scallops.

Another object of the invention is the provision of a scallop eviscerating system for removing the viscera from the edible portion economically and at a production rate that has not heretofore been possible.

Still another object of the invention is the provision of a new and improved system for urging the scallops into position for cleaning and for controlling the rate of flow down an inclined path.

Other objects and advantages of the invention will become apparent when considered in view of the following detailed description.

BRIEF DESCRIPTION OF THE FIGURES

FIG. 1 is a side elevational view, with parts removed, of one form of the apparatus of this invention for eviscerating shucked scallops;

FIG. 2 is a top plan view of the apparatus of FIG. 1;

FIG. 3 is a reduced, sectional view taken along line 3—3 of FIG. 2;

FIG. 4 is an enlarged, fragmentary view of a portion of the apparatus of FIG. 1;

FIG. 5 is a fragmentary, top plan view of the inclined rollers and drive arrangement therefor; and FIG. 6 is a fragmentary, side elevational view of a modified embodiment of the scallop eviscerator.

DETAILED DESCRIPTION OF THE INVENTION

Referring to the drawing, and particularly to FIGS. 1 and 2, there is illustrated an apparatus 10 for eviscerating shucked scallops 12 received from a conveyor arrangement 14 or other suitable delivery means.

The apparatus 10 includes a framework 16 having inclined members 18, 18 for rotatably supporting a series of generally parallel rollers 20 in an inclined path. Each roller 20 has a gear 22 secured to an outer end thereof, as shown most clearly by FIG. 5. The roller gears 22 are driven from reciprocating racks 24 and 26, a rack being mounted at each side of the inclined flight of rollers. The racks 24, 26 are slidably supported upon frame members 28 and are driven by a motor 30 through shaft 31, cranks 32 and 34, levers 36, 38 and brackets 40 secured to the racks. The cranks 32, 34 are 180° out of phase such that the racks 24 and 26 move in opposite directions during reciprocation. Since adjacent rollers are driven from opposite racks 24 and 26, adjacent rollers rotate in opposite directions, as shown by the arrows in FIG. 4.

The inclined path of the eviscerator formed by the plurality of rollers 20, which extends transversely of the path, descends from the input end of the eviscerator adjacent conveyor arrangement 14 to the output end adjacent a conveyor or trough 42.

The rollers are positioned to form nips between adjacent rollers such that when the roller drive racks 24 and 26 reciprocate, the rollers 20 are oscillated so that the upper portions of adjacent rollers are alternately rotated towards each other to pull the viscera 44, FIG. 4, from the scallop muscles and through the nips. Advancement of the scallops down the inclined path is facilitated when the rollers are rotated in the opposite direction, as disclosed in U.S. Pat. No. 3,662,431. The exterior portions of the rollers 20 may be provided with roughened gripping surfaces or may be covered with suitable non-slip materials. The sizes of the rollers 20 may vary depending upon the size of scallops to be eviscerated. Also, while in the embodiment of FIGS. 1-5, all rollers 20 are driven, it is to be understood that only selected rollers may be driven or adjacent rollers could be driven at different speeds.

A scrubber assembly 46 is mounted for reciprocation above the inclined flight of rollers 20 for urging the scallops into engagement with the rollers 20 which permits the rollers to remove the viscera from the muscles. The assembly 46 also serves to displace the muscles in a substantially uniform manner over the inclined flight of rollers and facilitates the control of scallops from the input conveyor 14 to the trough 42 for receiving the muscles.

In the embodiment illustrated by FIGS. 1-4, the scrubber assembly 46 includes a plurality of scrubbers 48 secured in spaced relation by suitable fasteners 50 to a framework 52 and adapted to be reciprocated longitudinally of the inclined flight of rollers 20 by a drive motor 54. The motor 54 rotates a crank arm 56 which is connected to the framework 52 by a lever 58, the opposite ends of the lever 58 being pivotably connected to the crank arm 56 and the framework 52.

Each scrubber 48 extends transversely of the inclined flight of rollers 20 and includes an upper plate 60 having bearings at each end, which may be grooved nylon slide blocks 62, FIG. 3, slidably displaceable upon rails 64, which are secured to the upper portions of covers or skirts 66. The skirts 66 may be mounted upon the framework 16 or the members 28. Depending from and secured to each plate 60 is a scallop contact member 68 bowed into an arcuate form and having a roughened outer surface for engaging the scallops and forcing them against the rollers.

A paddle or rake member 70, FIG. 4, is pivotably secured to the forward or uppermost end of reciprocating framework 52 for pulling and leveling the scallops upon the uppermost rollers 20 after they have been deposited thereon by conveyor 14. As can be observed from FIG. 4, as the scrubber assembly 46 moves up the inclined flight of rollers, the paddle 70 pivots to the broken line position moving over the scallops 12. When the direction of assembly 46 reverses and moves down the inclined path, the paddle 70 pivots to the full line position wherein stop 72 engages the framework 52 and scallops are raked or pulled downwardly upon rollers 20. In a preferred embodiment, the reciprocating framework 52 has a stroke of approximately 24 inches.

Fluid spray means are positioned above the inclined path formed by the rollers for cleaning the scallops positioned upon the rollers and for facilitating the advancement of the scallops down the inclined path. In the embodiment of FIGS. 1–4, a plurality of conduits 74 are mounted upon the reciprocating framework 20 and extend transversely of the flight of rollers. The conduits 74 are connected to a fluid source by suitable means, not shown. Each conduit is provided with a plurality of nozzles 76 which may be angularly adjusted to vary the fluid spray and serve to facilitate the movement of the scallops down the flight of rollers. Each outermost nozzle 76 is angled inwardly such that the fluid spray moves scallops away from the adjacent skirts 66 and between the rollers 20 and the contact member 68 of the scrubber assembly 46.

In operation, a plurality of muscles with attached viscera are delivered by the conveyor arrangement 14 upon the uppermost rollers 20. In the preferred embodiment adjacent rollers are oscillated in reverse directions so as to grip and sever the viscera without damage to the scallop meat. As adjacent rollers reverse directions, the scallops tend to move from the valleys or nips between adjacent rollers to the next lower valley or nip formed by a pair of rollers.

As the scrubber assembly reciprocates, the paddle 70 moves the scallops deposited by the conveyor 14 downwardly of the inclined path of rollers such that the reciprocating scrubbers 48 force the scallops into the valleys or nips between adjacent rollers. The scrubbers 48 also tend to turn or displace the scallops over the rollers and move them down the inclined path during reciprocation thereof such that all viscera is removed from the muscles. By the time the muscles reach the lowermost rollers and the conveyor or trough 42, all viscera has been removed and the muscles are ready for inspection and packaging. The fluid spray from nozzle 76 assists in the movement of the muscles down the inclined path and in the movement of the viscera into the nips between adjacent rollers.

FIG. 6 illustrates a modified embodiment of the invention wherein the scrubber assembly 46 of FIGS. 1–5 is replaced by a scrubber assembly 78. The scrubber assembly 78 may consist of one or more conveyor belts 80 which pass around rollers 82 and are driven from a motor, not shown, in one direction only, or driven by a reversible motor such that the belt 80 reciprocates. In the embodiment of FIG. 6, two conveyor belts 80 have been illustrated which are positioned in close proximity to the rollers 20 for forcing the scallops against the rollers. Adjustable spray nozzles 84, similar to the nozzles 76, are provided adjacent the uppermost portions of the belts 80 for directing fluid sprays between the rollers 20 and the belts 80. The rollers 20 may be driven in a manner as previously described.

I claim:

1. Apparatus for eviscerating shucked scallops having attached viscera comprising; a plurality of parallel rollers mounted adjacent each other in an inclined flight, means for driving at least selected ones of said plurality of parallel rollers, means for directing scallops onto the upper portion of said rollers, displaceable means mounted above said rollers for urging scallops into contact with said rollers and for distributing said scallops upon said plurality of rollers by leveling, turning and displacing scallops over the rollers, and means for displacing said scallop urging and distributing means, mounted above said plurality of rollers, longitudinally of the inclined flight of rollers for controlling the flow of scallops along the incline of flight of rollers.

2. Apparatus for eviscerating shucked scallops as recited in claim 1, wherein said scallop urging and distributing means mounted above said rollers includes at least one scrubber member mounted above the inclined flight of rollers for forcing the scallops against the rollers and into the valleys between adjacent rollers and for turning the scallops upon displacement of the scrubber member.

3. Apparatus for eviscerating shucked scallops as recited in claim 2, wherein said scrubber member is reciprocated longitudinally of the inclined flight of rollers by said displacing means.

4. Apparatus for eviscerating shucked scallops as recited in claim 2, wherein said scrubber member comprises a driven belt having a belt run positioned above and in generally parallel relation to said inclined flight of rollers.

5. Apparatus for eviscerating shucked scallops as recited in claim 1, and further including fluid spray means mounted upon said scallop urging and distributing means mounted above said rollers for displacement therewith.

6. Apparatus for eviscerating shucked scallops as recited in claim 2, said scallop urging and distributing means mounted above said rollers further including a paddle member for pulling scallops down said inclined flight of rollers.

7. The method of separating edible scallop muscles from the viscera of shucked scallops comprising the steps of; placing the muscles and attached viscera on the upper surface of an inclined path formed by a plurality of parallel rollers; evenly distributing and leveling the scallops on the rollers by positively forcing the scallops onto the rollers and into the valleys between adjacent rollers and positively turning scallops over the rollers; pulling the viscera from the muscles by gripping the viscera in the nips between adjacent rollers by rotating the upper portions of selected rollers; and controlling the flow of muscles down the inclined path.

8. The method of separating edible scallop muscles from the viscera of shucked scallops as recited in claim 7, wherein said scallops are evenly distributed upon the rollers by pulling the scallops down the inclined flight of rollers.

9. The method of separating edible scallop muscles from the viscera of shucked scallops as recited in claim 7, wherein the flow of scallops down the inclined path is controlled by rotating the rollers, applying a fluid spray to the rollers and scallops and positively rolling the scallops over the rollers.

10. The method of separating edible scallop muscles from the viscera of shucked scallops as recited in claim 7, wherein the scallops are urged against the rollers by applying a force normal to the inclined path of rollers.

* * * * *